(No Model.)
W. B. GERE.
PUMPKIN POWDER.
No. 592,906. Patented Nov. 2, 1897.
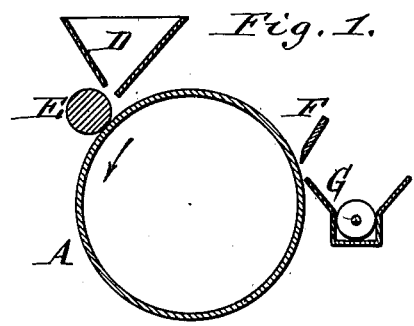
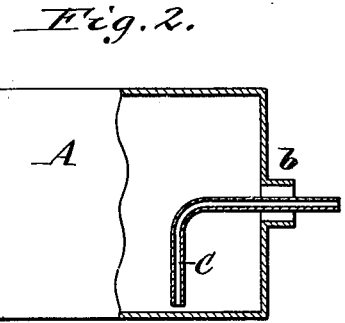
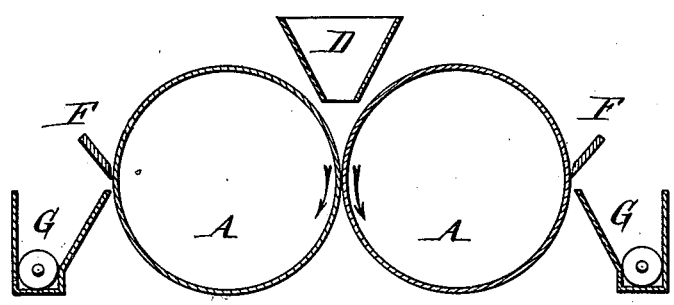
Witnesses
F. Gustav Wilhelm.
Ernest Pulsford.
William B. Gere, Inventor.
By Wilhelm & Bonner
Attorneys.

UNITED STATES PATENT OFFICE.

WILLIAM B. GERE, OF SYRACUSE, NEW YORK, ASSIGNOR TO THE MERRELL-SOULE COMPANY, OF SAME PLACE.

PUMPKIN POWDER.

SPECIFICATION forming part of Letters Patent No. 592,906, dated November 2, 1897.

Application filed February 5, 1897. Serial No. 622,157. (No specimens.)

*To all whom it may concern:*

Be it known that I, WILLIAM B. GERE, a citizen of the United States, residing at Syracuse, in the county of Onondaga and State of New York, have invented a new and useful Improvement in Pumpkin and Similar Powders, of which the following is a specification.

This invention has the object to place the edible substance of the pumpkin, squash, or sweet-potato upon the market in the form of a powder or meal which combines readily with water or milk and which is ready for use as an ingredient in making pies without requiring to be first cooked or otherwise prepared.

The common article of pumpkin flour which is now on the market is simply uncooked pumpkin dried and powdered and must be soaked a long time to restore the water which was expelled by drying, after which it must be cooked like green pumpkin before it can be used in making pies.

In practicing my invention in the best way known to me the edible substance of the pumpkin in its green condition is thoroughly cooked or steamed, preferably under a pressure of from ten to twenty pounds per square inch, for from thirty to forty-five minutes. Starch is then added to the moist pulp, preferably in the proportion of about one-half of an ounce of starch to one pound of pulp. Flour or other starch-containing substances or gluten or glutinous substances may be substituted for the starch. The moist pulp is next thoroughly dried, preferably upon the outer surface of a cylinder which is heated by steam. The dried pulp is removed from the cylinder by a scraper, and then further comminuted, if necessary, to a coarse meal or powder, preferably in a tumbling-machine of any ordinary construction. Sugar, salt, and spices are then added in the proper proportion. For instance, to one hundred pounds of pumpkin powder I add one hundred and fifty pounds of sugar, two pounds of ginger, two pounds of cinnamon, and fifteen pounds of salt. This final product is a dry meal or coarse powder and contains all of the ingredients for a pumpkin pie, excepting the milk and the crust, in condition for immediate use, so that the cook has only to take the necessary quantity of this pumpkin powder, mix it with the proper proportion of milk or milk and water, and place it upon the crust, when the pie is ready for baking.

The starch which is added to the moist pulp absorbs moisture therefrom, whereby the starch-cells are caused to swell and the starch becomes thoroughly incorporated with the moist pulp, forming a homogeneous mixture therewith. During the subsequent drying of the mixture the heat expels the moisture from the starch and causes the starch-cells to burst, leaving the starch in the best possible condition for absorbing moisture quickly and communicating it to the pumpkin substance.

The powder prepared as above described absorbs moisture at once and assumes a mushy or jelly-like consistency in a few moments, possesses a fresh color and fine natural flavor, and is in the proper condition for immediate use. This dry preparation can be put up in paper or pasteboard packages without danger of deteriorating, thus saving the expense of the costly tin cans which are required for canned pumpkin and also reducing the weight and the cost of transportation, while the flavor is better than that of canned pumpkin.

Squash and sweet-potato powder may be prepared in the same manner, and in referring herein to "pumpkin" powder I wish it to be understood that "squash" and "sweet-potato" powder are embraced by the same term.

While it is preferred to thoroughly dry the pulp, so as to produce a dry final product, still, if desired, some of the moisture may be left in the pulp, so as to produce a slightly damp or moist product.

In the accompanying drawings, Figure 1 is a cross-section, and Fig. 2 is a longitudinal section, of a drying-cylinder which is suitable for drying the moist pulp. Fig. 3 is a cross-section of a duplex drying-machine for this purpose.

Like letters of reference refer to like parts in the several figures.

A represents the drying-cylinder, which turns upon trunnions *a* and *b*. The trunnion *b* is hollow and supplies the steam to the interior of the cylinder and also accommodates a drain-pipe C, through which the condensed water is carried off to a steam-trap.

D represents the feed-hopper which receives the moist pulp, and E the feed-roller, in front of which the pulp passes from the feed-hopper and which distributes the pulp, so that it adheres in a thin layer to the outer surface of the cylinder. The latter rotates slowly in the direction of the arrow.

F represents the scraper, whereby the dry material is removed from the opposite side of the cylinder and delivered into a receiving-trough G.

The pulp is thoroughly dried in passing from the feed-hopper to the scraper and is removed from the cylinder partly in the form of thin sheets and flakes and partly in the form of a coarse meal or powder.

In the duplex machine represented in Fig. 3 the moist pulp is fed from the feed-hopper D between two cylinders which rotate downwardly at their opposing sides in the direction of the arrows, and each cylinder is provided at the outer side with a scraper F and a receiving-trough G.

While these drying-machines are suitable for this purpose, I do not wish to limit myself to any particular kind of machine for practicing my invention.

I claim as my invention—

The herein-described pumpkin powder which readily absorbs moisture and forms therewith at once a mushy or jelly-like mixture without previous soaking and which is in the proper condition for immediate use, said powder consisting of the cooked or steamed edible substance of the pumpkin, combined with starch, the cells of which have been opened by moisture and heat, substantially as set forth.

Witness my hand this 2d day of February, 1897.

WILLIAM B. GERE.

Witnesses:
HOWARD A. LYON,
HENRY F. HINKLEY.